Oct. 30, 1923.

W. S. HARLEY

ENGINE

Filed April 25, 1919

1,472,068

Inventor
William S. Harley
By: Edwin B. H. Town Jr. Atty.

Patented Oct. 30, 1923.

1,472,068

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

ENGINE.

Application filed April 25, 1919. Serial No. 292,730.

*To all whom it may concern:*

Be it known that I, WILLIAM S. HARLEY, a citizen of the United States, residing at Milwaukee, in the county of Milwaukee and State of Wisconsin, have invented new and useful Improvements in Engines, of which the following is a specification.

This invention relates to engines.

One of the objects of this invention is to insure uniform correlated expansion of the co-operating members of the mechanism.

A further object is to insure regular operation of the engine irrespective of the temperature at which the engine is operating.

A further object is to provide a motor in which the errors of timing of the mechanism due to expansion of the parts are eliminated.

A further object is to provide a light weight motor.

An embodiment of the invention is shown in the accompanying drawing.

Figures 1, 2:
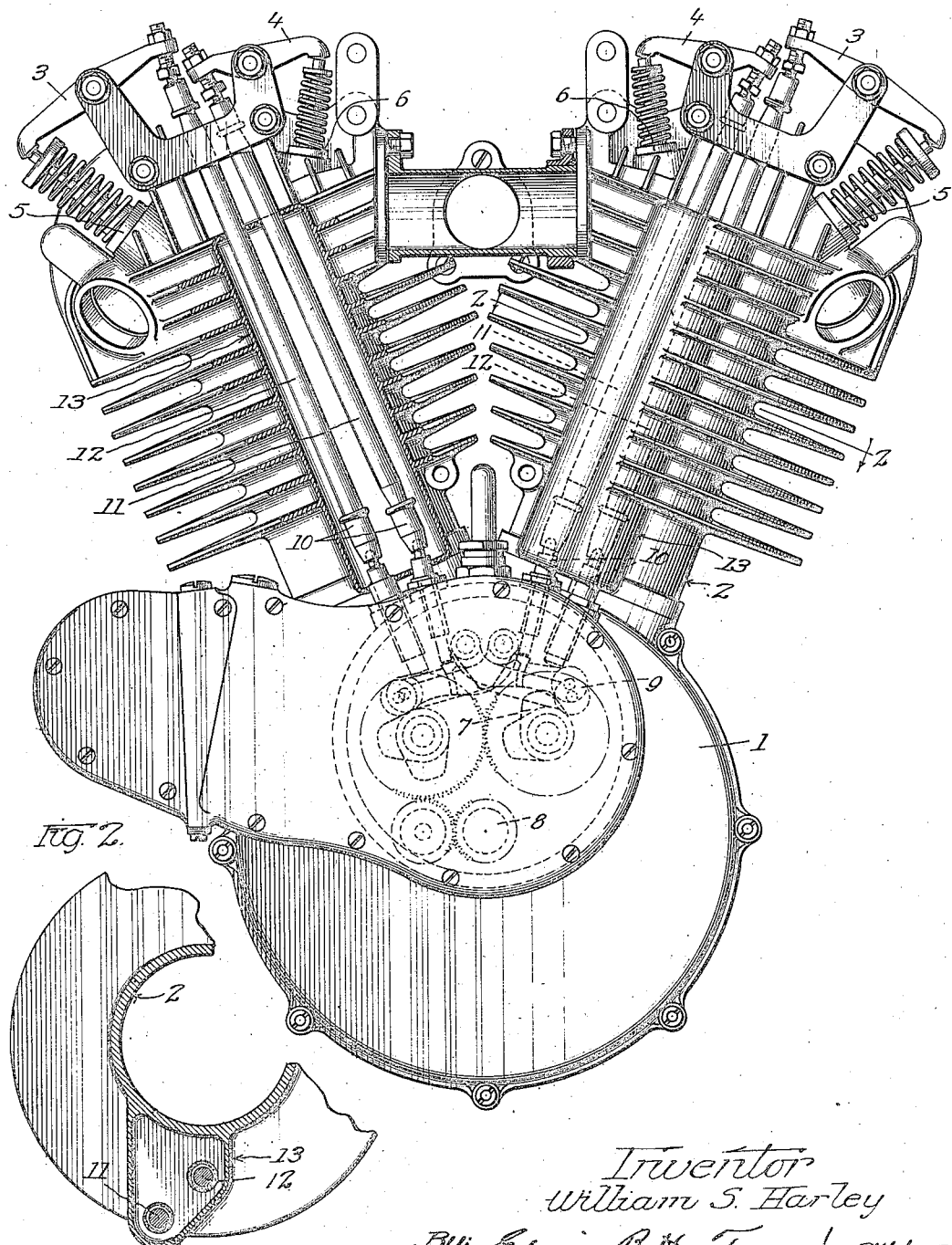
Fig. 1 shows a side elevation partly in section of a motor embodying my invention.
Fig. 2 is a fragmentary sectional view taken along the line 2—2 of Fig. 1.

Fig. 1 shows a gasoline motor comprising the usual crank case 1, to which are secured the aluminum cylinders 2, which carry at their upper end the valve operating levers 3, and 4, which in turn cooperate with the exhaust and inlet valves 5 and 6 respectively also carried by said cylinders. These valves are actuated by cams 7, driven from the crank shaft 8. The followers 9 for these cams 7 transmit their motion, by means of pins 10, to the push rods 11 and 12. These push rods 11 and 12 are composed of aluminum and therefore have the same coefficient of expansion as the cylinder. In order to maintain the push rods at the same temperature as the cylinders, a housing 13 surrounding said push rods is provided as an integral part of the cylinder. This housing 13 is closed except for the openings for the operating pins 10 and the push rods 11 and 12, and thereby forms a heating box, or stove, for the push rods 11 and 12. Inasmuch as the interior of this heating box or stove is in direct connection with the wall of the cylinders, the air in the interior of this heating box will be maintained at substantially the same temperature as the wall of the cylinder and therefore the push rods will be maintained at substantially the same temperature as the wall of the cylinder.

As the push rods and cylinders have the same coefficient of expansion and are maintained at substantially the same temperature, it is obvious that an elongation of one will be balanced by a similar elongation of the other at all temperatures.

It will be seen that the timing of the valves is therefore not interfered with by the expansion of the cylinders but that the valves have exactly the same timing as they did at the beginning of the operation of the motor.

By this construction it is possible to use an aluminum cylinder to secure the light construction of motor and yet be free from the errors in timing due to the expansion of the cylinder by heat.

Obviously other structures may be devised which will embody the invention herein set forth.

I claim:

1. An engine comprising a cylinder, timing means including a push rod, and a housing for the push rod, said housing and cylinder having a side wall in common and extending throughout the length of the cylinder.

2. In a gasoline motor having a cylinder, timing mechanism, means for maintaining said timing mechanism and cylinder at substantially the same temperature, said means comprising a casing surrounding said mechanism and structurally integral with said cylinder and having a side wall in common therewith throughout its length.

3. In an engine having a cylinder, a valve, valve operating means, and means for maintaining said operating means at substantially the same temperature as the cylinder, said means comprising a casing structurally integral with the cylinder and directly heated thereby enclosing said operating means.

4. An engine comprising a cylinder, valves mounted on said cylinder, means for operating said valves, and means for obtaining equal expansion of said valve operating means and said cylinder, whereby uniform timing is secured.

5. An engine comprising a cylinder, a valve mounted on said cylinder, valve actuating means, and means comprising a casing having a side wall in common with the cylinder for keeping the cylinder and valve actuating means at substantially the same temperature.

6. An engine comprising cooperating parts, one of said parts including a cylinder subjected to heat, and means including a substantially closed housing separated from the cylinder by a relatively thin wall for causing said heat to be transmitted to the other of said co-operating parts, whereby the expansion is substantially the same for said co-operating parts.

7. A motor having a cylinder, valves therefor, valve actuating means comprising a pair of push rods and a housing for said pair of push rods heated entirely by direct radiation from said cylinder, whereby said rods and cylinder are maintained at substantially the same temperature.

8. An engine comprising a cylinder, and valve actuating means, said valve actuating means being heated by direct radiation from said cylinder and being maintained at substantially the same temperature as the cylinder.

9. An engine having a cylinder of aluminum, a valve mounted thereon, and an aluminum push rod for actuating said valve, said aluminum push rod being directly heated by and maintained at the same temperature as said cylinder.

10. An engine comprising a cylinder, a valve carried thereby, valve actuating means, and a housing forming a unitary structure with said cylinder and having a relatively thin wall in common therewith throughout its length, said housing enclosing a portion of said valve actuating means.

11. An engine comprising a cylinder composed of aluminum, a housing formed integrally thereon and having a wall in common therewith extending throughout the length of the cylinder, valves carried by the cylinder, and an aluminum valve actuating push rod positioned within said housing.

12. An engine comprising a cylinder, a valve, valve actuating means, and means for maintaining said valve actuating means and said cylinder at substantially the same temperature, said cylinder and valve actuating means having the same coefficient of expansion.

In witness whereof, I have hereunto subscribed my name.

WILLIAM S. HARLEY.